Dec. 27, 1960    E. J. McCARTNEY    2,966,591
OBJECT DETECTION AND TRACKING SYSTEM
Filed May 9, 1956    3 Sheets-Sheet 1

INVENTOR
EARL J. McCARTNEY
BY
C. V. Craddock
ATTORNEY

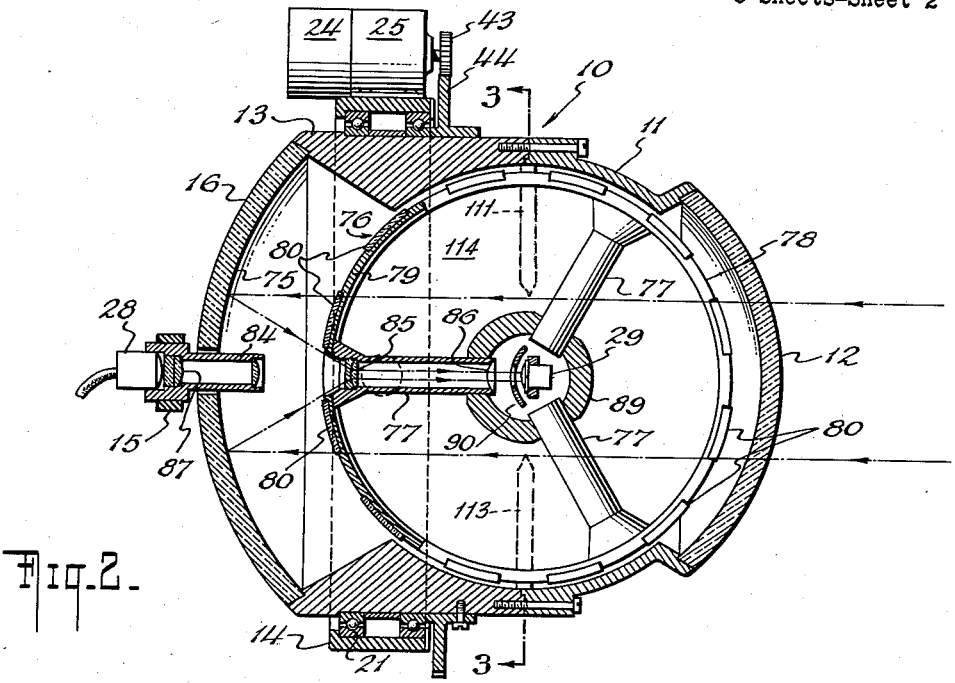

Dec. 27, 1960   E. J. McCARTNEY   2,966,591
OBJECT DETECTION AND TRACKING SYSTEM
Filed May 9, 1956   3 Sheets-Sheet 3
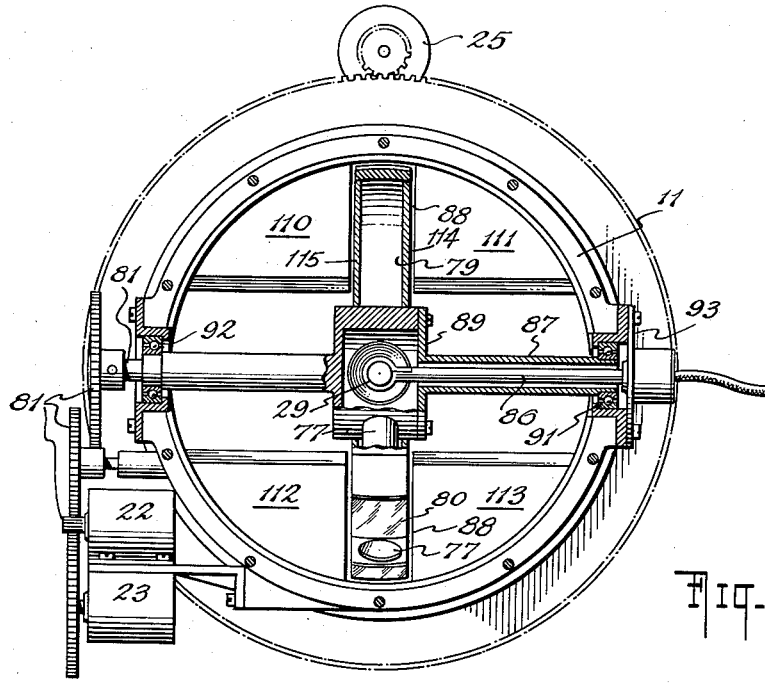
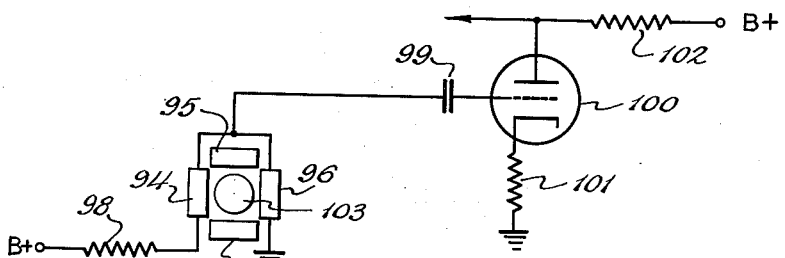
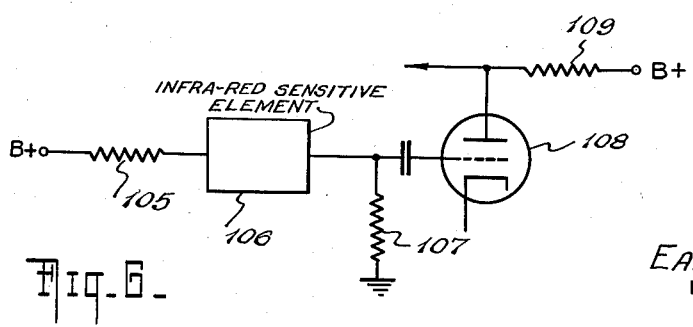
INVENTOR
EARL J. McCARTNEY
BY
ATTORNEY

United States Patent Office 2,966,591
Patented Dec. 27, 1960

2,966,591

OBJECT DETECTION AND TRACKING SYSTEM

Earl J. McCartney, Rockville Centre, N.Y., assignor to Sperry Rand Corporation, a corporation of Delaware Filed May 9, 1956, Ser. No. 583,873

14 Claims. (Cl. 250—203)

This invention relates to an object detection and tracking system and more particularly to such a system which tracks a moving object and simultaneously searches the area surrounding said object.

In infra-red object detection systems, to which this invention is particularly adapted, provision may be made for searching an area in space for an object which might be an enemy aircraft to be destroyed, a friendly aircraft to be safely landed, a ground object to be bombed or any other object whose course relative to the object detection system is to be followed. When the desired object is located, the mode of operation of the system may be changed so that the object is tracked to supply continuous information as to its direction relative to the object detection system. However, when the system is operating in a tracking mode, it is desirable to simultaneously operate in the search mode so that new targets can be detected and so that the tracking operation of the system, which may be automatic, can be monitored.

A scanning device is a relatively large, heavy, complex and expensive component of the object detection system. If carried by an aircraft, the scanning device is frequently mounted in a specially provided dome or bulge which may add materially to the aerodynamic drag of the craft. In infra-red scanners, efficiency is greatly increased by refrigerating the light-sensitive cells adding to the complexity of the scanner and making it desirable to use light-sensitive elements which are as stationary as is possible.

It is an object of this invention to provide an object detection system which simultaneously tracks on object and searches the surrounding area.

It is an object of this invention to provide a scanning device which utilizes a single energy-collecting and focussing system for simultaneous tracking and searching.

It is an object of this invention to provide a "look-through" tracking scanner.

It is an object of this invention to provide an infra-red scanning device for simultaneously tracking and searching in which the tracking and searching sensitive elements are stationary relative to the scanning motions.

The above objects are achieved in this invention by the use of a collecting and focussing system which provides an image of the area to be scanned. A scanning means projects on a sensitive element successive elemental portions of the image lying on a scanning line, to provide a series of search signals which are applied to the search display component. The scanning means also causes said scanning line to move to cover the entire image. Provision is also made to project a selected portion of the image upon a sensitive cell arranged to provide a tracking signal which is utilized to orient the collecting and focussing system to properly include the target.

Other objects and advantages will occur to those skilled in the art from a consideration of the following specification taken in connection with the accompanying drawings in which Fig. 1 is a block diagram of an object detection system embodying the principles of this invention;

Fig. 2 is a side elevation view in section of the scanning mount shown in Fig. 1;

Fig. 3 is a front elevation view in section of the scanning mount shown in Fig. 1;

Fig. 4 is a side elevation view in section of the scanning mount shown in Fig. 1 with the scanning wheel in a different position than is shown in Fig. 2;

Fig. 5 is a schematic diagram showing the electrical connections of the tracking light-sensitive cell;

Fig. 6 is a schematic diagram showing the electrical connections of the searching light-sensitive cell.

Figure 1:
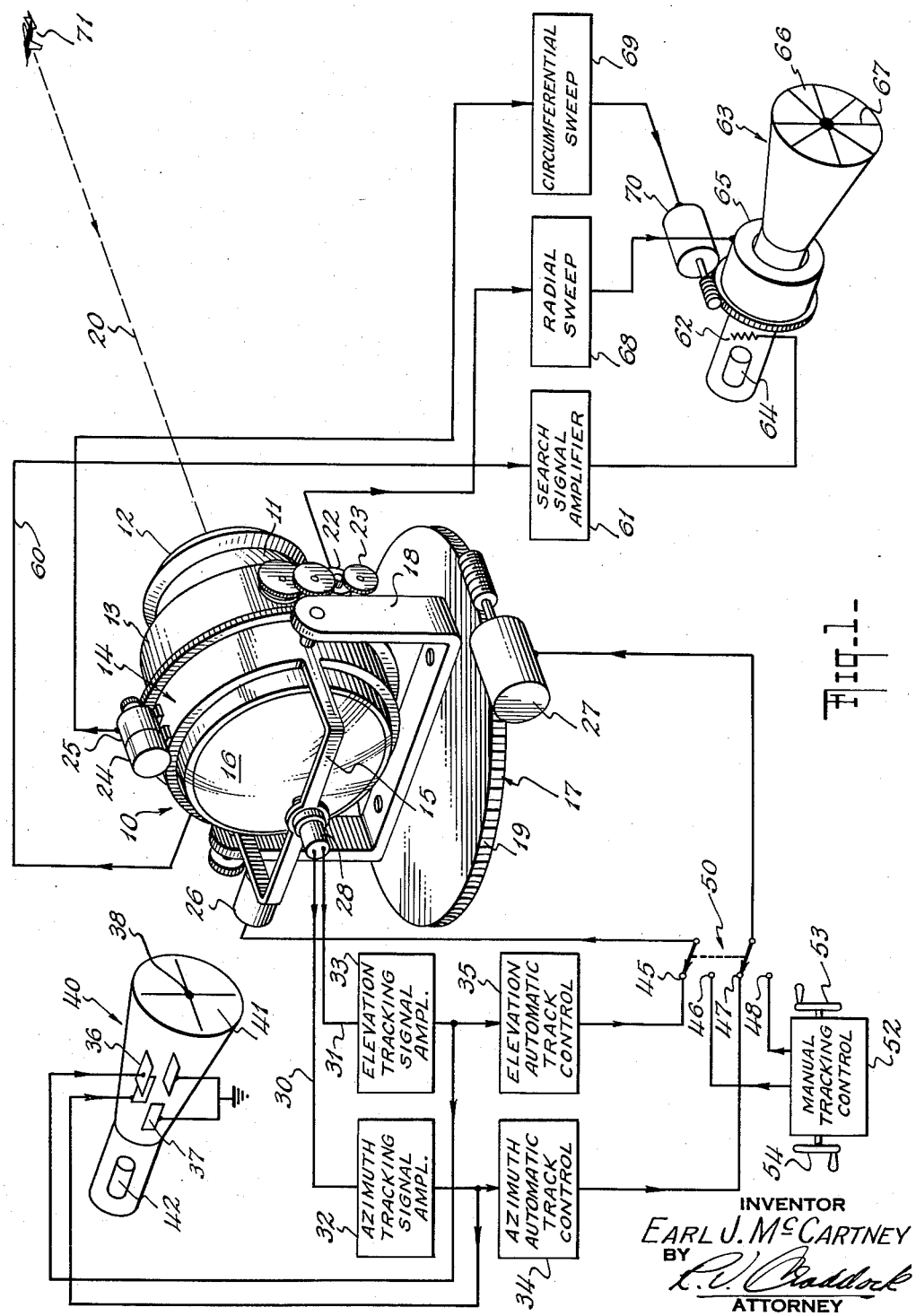

Fig. 1 shows a scanning mount 10 comprised of a hollow front, more-or-less spherical section 11 joined to a hollow back cylindrical section 13. Sections 11 and 13 are rigidly bolted together. Front section 11 has a transparent lens portion 12. Back section 13 has a spherical base 16. Scanning mount 10 also comprises an annular track member 14 which encircles section 13 and supports sections 11 and 13 for rotation about the axis of symmetry of these sections. Ball bearings 21 are provided between race-ways respectively fixed to section 13 and track 14. A U-shaped member 15 has its ends joined at diametrically opposite positions on the track 14 and its base portion supports the tracking light-sensitive cell 28 which receives infra-red light along a narrow beam aligned with optical axis 20 of the spherical portion 12 and base 16 which may be coincident with the axis of symmetry of section 13. A motor 24 is fixed to the top of track 14 and has a pinion 43 meshing with an annular rack 44 surrounding and fixed to section 13 to rotate sections 11 and 13 within the track 14. A motor 22 supported by sections 11 and 13 is also provided to operate a line scanning mechanism carried within the spherical recess within sections 11 and 13 to effect line scanning as will be described below.

The scanning mount 10 is supported for rotation about two axes by pedestal 17 which is comprised of a base 19 arranged for rotation about a vertical axis and a yoke member 18 supported on said base 19. Track 14 is journalled at diametrically opposite portions in the yoke 18. Motor 26 rotates the track 14 and sections 11 and 13 about a horizontal axis including said journals in yoke 18, i.e., in elevation. Motor 27 rotates base 19 about its vertical axis, i.e. in azimuth.

A connection 30 from tracking cell 28 provides a signal indicative of the azimuthal deviation of the optical axis 20 of the scanning mount 10 with respect to the target 71 and applies this signal to the azimuth tracking signal amplifier 32. The output of the azimuth tracking signal amplifier 32 is applied to the azimuth automatic track control component 34, the output of which is connected through switch 50, when this switch is in its upper position, to motor 27 and rotates the base 19 to cause the scanning mount 10 to track target 71 in azimuth.

Lead 31 from tracking cell 28 provides a signal representative of the elevational deviation of the optical axis 20 of scanning mount 10 with respect to the target 71 and applies it to the elevation tracking signal amplifier 33. The output of component 33 is applied to elevation automatic track control 35 which is connected through switch 50, when this switch is in its upper position, to motor 26 and causes the scanning mount 10 to track target 71 in elevation.

Automatic track control components 34 and 35 may be any circuit capable of receiving an error signal indicative of deviation between target 71 and the optical axis 20 and supplying a positive or negative voltage of the proper amplitude to the motors 26 and 27 to cause the scanning mount 10 to change direction to lessen the deviation. One example of a circuit which might be used for components 34 and 35 is shown in Patent No. 2,147,674 to H. A. Satterlee, granted February 21, 1939, and entitled "Apparatus for Controlling Rotation."

The outputs of azimuth and elevation tracking signal amplifiers 32 and 33 may be respectively applied to horizontal deflection plates 37 and vertical deflection plates 36 of cathode ray tube 40. Tube 40 also has an electron gun 42 and a screen 41.

When switch 50 is in its down position, motors 26 and 27 are connected through contacts 46 and 48, respectively, to the elevation and azimuth outputs, respectively, of manual tracking control component 52. Component 52 has two adjusting means 54 and 53 provided for making adjustments in the elevation and azimuth, respectively, of the optical axis 20 of scanning mount 10.

Scanning mount 10 also includes a search sensitive cell 29, which, due to the scanning operation of mount 10, receives light from a narrow pencil beam which continuously scans across a scanning line in a plane which includes optical axis 20, said plane being continuously rotated about said optical axis. The search signal provided by the search sensitive cell 29 in scanning mount 10 is connected through lead 60 to search signal amplifier 61, the output of which is connected to the grid 62 of cathode ray tube 63. Tube 63 also has an electron gun 64 and a deflection yoke 65. An indication of the angle between the optical axis and a line to the element being instantaneously scanned by the scanning means within mount 10 is provided by pick-off 23 and applied to the radial sweep wave generator 68. Component 68 supplies a sawtooth current deflection wave to the deflection yoke 65 synchronized with each linear sweep of the scanning device across the area being scanned. Pick-off 23 could merely be a commutator providing radial sweep component 68 with a synchronizing pulse each time a linear sweep is initiated in the scanning mount 10. The angle of rotation of a line to the scanned element about the optical axis 20 is indicated by synchro 25, the output of which is connected to circumferential sweep circuit 69. Circuit 69 might be merely an amplifier, the output of which is applied to receiving synchro 70 which rotates yoke 65 in synchronism with the rotation of sections 11—13.

For a more detailed explanation of the structure of scanning mount 10, reference is made to Figs. 2, 3 and 4. A scanning wheel 76 is mounted for rotation in section 11 as by an axle 87 journalled therein. One end of axle 87 is tubular and the open end is supported by the bearings 91. The other end of axle 87 is journalled in bearings 92 and is connected through gears 81 to the rotors of motor 22 and pick-off 23. Bearings 91 and 92 are supported on the interior of spherical section 11 of the scanning mount 10 and are diametrically opposite.

The central portion of axle 87 is enlarged to form a hollow hub 89. Scanning wheel 76 includes three optical tubes 77 which pass through the walls of the hollow hub 89 and provide a support, as spokes, for the rim 78 through which they also pass. Each tube 77 contains lenses 85 and 86. Rim 78 has the shape of the surface of an equatorial zone of a sphere. Mirrors 80 are fixed at equal intervals around the rim 78, there being, in this illustrative embodiment, four mirrors 80 between each tube 77 and the next. The surface of each of the mirrors 80 has the shape of the surface of a sphere whose center is on the axis of the wheel 76. The surface of rim 78 of scanning wheel 76 between mirrors 80 and optical tubes 77 is made optically black, i.e., light-absorbing to the highest degree practicable. Thus this surface in conjunction with the optical transmitting property of optical tubes 77 provides a non-reflecting property for each of the complete surfaces between mirrors 80.

Scanning cell 29 is supported within the hollow hub 89 by support 86 which is fixed to assembly 93 bolted to the outside of the spherical sections 11 and 13. Sensitive cell 29 is aligned axially with the tubes 77. The sides of wheel 76 are enclosed by annular opaque members 114 and 115. In practice, the number of tubes which can be used, or number of scan lines produced per unit of time, will be governed by the desired angular diameter of the search field. The three tubes shown can be employed with a search field 60 degrees in diameter.

The inner surface 75 of base 16 of the conical section 13 is a spherical reflecting surface. It has a hole therethrough through which extends an optical tube 84 supported by the U-shaped member 15, the hole walls therefore being concentric with the optical axis 20 of the system. On the end of optical tube 84 opposite the end which protrudes into the spherical recess within sections 11 and 13 is supported the tracking sensitive cell 28.

Spherical window or lens 12 conforms generally to the shape of spherical section 11 and is on the side thereof opposite to the section 13.

A light shield 90 having an aperture therein is supported by support 86 between light cell 29 and reflecting surface 75. Four opaque members 110—113, each having generally the shape of a quadrant, are fixed within section 11 near its junction with section 13. The members 110—113 are substantially in a vertical plane (as viewed in Figs. 2 and 4) containing the axis of axle 87. Upper members 110 and 111 are spaced from lower members 112 and 113 to form an elongated aperture limiting the light rays entering through element 12 to those which may be properly focussed by the optical system. Members 110—113 each make a light-tight fit against the inner surface of section 11 and a close, substantially light-tight clearance with sides 114 and 115 of wheel 76.

Fig. 5 shows the electrical connections and elements of the tracking cell 28. Four infra-red sensitive strips 94, 95, 96 and 97 are arranged as the sides of a square but are out of contact with each other. The strips 94 and 96 form one associated pair while the strips 95 and 97 form a second associated pair. The strips 94 through 97 may be lead sulphide, lead selenide or lead telluride and may be refrigerated during use to increase sensitivity. One end of the sensitive strip 94 is connected through resistor 98 to a source of positive potential. The other end of strip 94 is connected through sensitive strip 96 to ground. The junction of strips 94 and 96 is connected through coupling condenser 99 to the control grid of triode 100. The cathode of triode 100 is connected through resistor 101 to ground. The plate of triode 100 is connected through resistor 102 to a source of positive potential. The output is taken from the plate of triode 97. Sensitive strips 95 and 97 are connected in the same manner as strips 94 and 96 but, in the interest of not adding to the complexity of the figure, the connections with respect to strips 95 and 97 are not shown. The spot of infra-red light 103 is shown at the center of the configuration of strips 94—97 as projected by the optical system.

Fig. 6 shows the electrical elements and connections used in the search cell 29. Sensitive strip 106 may be a sensitive strip such as was described above with respect to the strips 94 through 97. One end of strip 106 is connected through resistor 105 to a source of plus potential. The other end of strip 106 is connected through resistor 107 to ground and to the control grid of triode 108. The plate of triode 108 is connected through resistor 109 to a source of plus potential. The output of cell 29 is derived from the plate of triode 108.

When the infra-red spot 103 is in the middle of sensitive strips 94 through 97, or impinges equally upon all of these strips, the resistance of strips 94 and 96 will be equal and a certain voltage will appear at the junction strips 94 and 96 causing a corresponding voltage to appear at the plate of triode 100. However, if spot 103 should move to the right impinging more on sensitive strip 96 than on strip 94, the resistance of strip 96 would decrease while the resistance of strip 94 would increase causing the potential at the junction of strips 94 and 96 to decrease and causing the voltage at the plate of triode 100 to correspondingly increase. On the other hand, if infra-red spot 103 should move to the left to impinge more on strip 94 and less on strip 96, then the resistance of strip 94 would decrease while the resistance of strip 96 would increase causing the voltage at the junction of strips 94 and 96 to increase and the output voltage at the plate of triode 100 to correspondingly decrease. Thus, the voltage at the plate of triode 100 is an indication of how well centered the spot 103 is with respect to the strips 94 and 96. A second triode not shown but corresponding to triode 100 and connected to strips 95 and 97, gives an output voltage indicative of the relation of spot 103 to strips 95 and 97. Thus, if spot 103 is a projection of a hot part of the object being tracked such as the exhaust of a jet plane, then the output of triode 100 is an indication of horizontal tracking error while the output of the triode connected to strips 95 and 97 gives an indication of the vertical tracking error.

In Fig. 6, the sensitive strip 106 varies in electrical resistance in accordance with the light falling thereon. As more infra-red is projected on the strip, its resistance decreases and the voltage at the junction of strip 106 and resistor 107 increases to give a decrease output voltage at the plate of triode 108. If less light falls on element 106, its resistance increases causing a lower voltage at the junction of strip 106 and resistor 107 which in turn causes a higher voltage at the plate of triode 108.

In the operation of the scanner 10, spherical reflecting surface 75 projects an image of the area in front of it on a curved focal surface, this area being defined by the members 110—113. The transparent lens section 12 has such a light refracting characteristic and is so shaped as to form a correcting plate for the spherical mirror 75 to thereby cause its image to be relatively free of aberrations. The use of the correcting lens 12 in optical systems employing a spherical mirror is common practice, such lens being a Schmidt-like lens. The shape and optical effects of a Schmidt lens is clearly described and illustrated in Navy Department personnel training publication NavPers 10095 entitled "Physics for Electronics Technicians," pages 230 to 232. The curvature of this lens and the light refraction produced thereby are so small that no accurate illustration thereof has been attempted, it being understood that such curvature is present and that such refraction occurs. As the scanning wheel 76 is rotated at a relatively high rate of speed by the motor 22, each optical tube 77 successively rotates to scan along an imaginary line across the center of said image. The element of the image being projected into the active tube 77 is projected by the lenses 85 and 86 upon the sensitive strip 106 of the cell 29. The aperture in the light shield 90 permits only one tube 77 at a time to project light from the image being scanned upon the cell 29. The scanning mount 10 is also continuously rotated within the track 14 at a relatively slow rate of speed about the optical axis 20. By this arrangement, each scanning tube 77 successively scans a line across the image but the line is being continuously rotated about its midpoint by the rotation of scanning mount 10. The signal produced by the search cell 29 is thus representative of a plan position indication of the image being scanned.

At intermittent intervals during the rotation of wheel 76, one after the other of the mirrors 80 reaches alignment with the optical tube 84 associated with the tracking cell 28. The mirror 80 thus aligned projects a small central portion of the image into the tube 84 and it is projected by the lens 87 as the spot 103 seen in Fig. 5. The rotation of scanning wheel 76 thus brings alternately into alignment with optical tube 84 the mirrors 80 and the intervening portions of rim 78 which are non-reflecting, as described previously. Thus the image or radiation projected by lens 87 as spot 103 is modulated or chopped by the rotation of wheel 76. Light cell 28 thus is effective to intermittently produce alternating voltages representative of horizontal and vertical error.

When the system shown in Fig. 1 is in operation, the output of the search cell 29 is amplified in search signal amplifier 61 and applied to control grid 62 of cathode ray tube 63 to control the intensity of the beam emanating from gun 64 and hence the light intensity of the trace on screen 66. An indication of the angular position of the scanning wheel 76 is obtained from the pick-off 23 and applied to the radial sweep component 68. Radial sweep component 68 provides a sawtooth wave for each sweep of a tube 77 from one side to the other of the image projected by the reflecting surface 75. This sawtooth wave produced by radial sweep component 68 and applied to the scanning yoke 65 causes the electron beam in the tube 63 to trace a diametrical line across screen 66. The angular position of this line corresponds to the position of the line traced by the scanning tube across the image. As scanning mount 10 is rotated about the optical axis by the motor 24, the pick-off 25 provides an output to the circumferential sweep component 69, the output of which is applied to motor 70 which causes the scanning yoke 65 to rotate so that the angular position of the line trace on screen 66 corresponds to the angular position of the scanning wheel 76. A plan position indication is thus shown on screen 66 of cathode ray tube 63 corresponding with the scanning of scanned area in space by scanning mount 10 and search cell 29.

The output of the triode 100 shown in Fig. 5, indicative of azimuth tracking error is amplified in amplifier 32 and applied to the azimuth automatic track control component 34 which, in the automatic mode of operation, is connected through switch 50 to azimuth motor 27. An indication of azimuth error from the cell 28 results in a corresponding azimuth movement of the scanning mount 10 so that the tracking cell 28 will be automatically aligned with the tracked object.

Azimuth tracking error produced by the cell 28 is amplified in component 33 and applied to the elevation automatic track control 35. In the automatic mode of operation, the output of component 35 is applied to the elevation motor 26 to orient the scanning mount 10 in elevation so that the tracked object is automatically aligned in elevation with the cell 28.

When desired, the switch 50 may be shifted to its lower position in which case the scanning mount 10 is oriented in elevation and azimuth as directed by the manual tracking control 52. The crank 54 is turned to orient the scanning mount 10 in elevation while the crank 53 is turned to orient the scanning mount 10 in azimuth.

The output of the azimuth tracking signal amplifier 32 controls the horizontal position of spot-trace 38 on screen 41 of cathode ray tube 40. The output of the elevation tracking amplifier 33 controls the elevational position of the trace 38. The position of the spot 38 on screen 41 shows the accuracy with which scanner 10 is tracking the object and may be used for monitoring the automatic mode of operation and for lining up the scanner 10 with the desired object in the manual mode of operation. An optical sight might also be associated with the tracker 10 for use in the manual mode.

The system hereinabove set forth provides azimuth and elevation tracking error signals which may be used for gun laying or other purposes and also provides a plan position indication of the area about the tracked object so that the operator may monitor the operation of the system and watch for new targets.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for scanning an area in space and for simultaneously detecting and tracking an object in said area while maintaining said area scan, comprising first means for successively scanning those elemental portions of said area which lie along a line in said area, second means for moving said first means in a direction different from the direction of said linear scan whereby said scanning means is caused to scan an area, first sensitive means responsive to a distinctive characteristic of an object in an elemental portion of said area scanned for providing an indication of the presence of said object, means responsive to said first and second means and said first sensitive means for indicating that particular portion of said area containing said object, second sensitive means responsive to said object characteristic for providing a measure of the error between a predetermined elemental portion of said scanned area and that portion containing said object, and means responsive to said second sensitive means for controlling the orientation of said first and second means in a manner to reduce said measure toward zero whereby to maintain said object in said predetermined elemental portion of said scanned area.

2. The combination of claim 1 in which the means for moving said scanning means positions said scanning means to scan a succession of radially disposed lines.

3. In an object detecting system having means for collecting and focussing energy waves emanating from an area, a first means sensitive to said energy waves to produce a signal representative of the amplitude of said energy waves falling thereon, a scanning means for scanning said energy waves collected and focussed by said collecting and focussing means including means for projecting the energy waves emanating from each element of said area successively upon said first sensitive means, a second means sensitive to said energy waves and comprising at least an associated pair of elements to produce a signal representative of the difference of the amplitude of said energy waves falling upon each associated pair, and means for intermittently projecting upon said second sensitive means said energy waves collected and focussed by said collecting and focussing means from one selected portion of said area.

4. The combination of claim 3 in which the energy waves are infra-red.

5. The combination of claim 3 further including means responsive to the difference signal from said second sensitive means for orienting said collecting and focussing means in a direction and amount to reduce said difference signal toward zero.

6. In combination, a primary collecting system for collecting and focussing energy waves emanating from an area, a first means sensitive to said energy waves, second means sensitive to said energy waves and comprising at least an associated pair of sensitive elements producing signals indicative of the difference in amplitude of said energy falling upon each associated pair, a scanning wheel supported for rotation about a first axis and having a first plurality of secondary focussing systems for focussing said waves emanating from each elemental portion of said area successively on said first sensitive means, said scanning wheel having a second plurality of secondary focussing systems for focussing energy waves emanating from a selected predetermined portion of said area and collected and focussed by said system on said second sensitive means, said first and second focussing systems each being regularly placed about the periphery of said scanning wheel, means for rotating said wheel about said first axis, and means for rotating said wheel about a second axis at right angles to said first axis.

7. The combination of claim 6 further including means responsive to the signal from said second sensitive means for orienting said collecting and focussing means in a direction and amount to reduce said difference signal toward zero.

8. The combination of claim 6 in which said first and second sensitive means are fixedly supported with respect to the rotation of said wheel.

9. A primary optical system having a reflecting surface, a first light sensitive means, a second, signal producing light sensitive means having at least an associated pair of light sensitive elements producing signals indicative of the difference of light intensity falling upon each associated pair, a scanning wheel supported for rotation about a first axis and having a plurality of light focussing systems for focussing successive elemental portions of said reflecting surface upon said first light sensitive means, said scanning wheel having a further plurality of light focussing elements for focussing only a predetermined portion of said reflecting surface on said second light sensitive means, means for rotating said wheel about said first axis, and means for rotating said wheel about an axis at right angles to said first axis.

10. The system set forth in claim 9 further including means responsive to the signal from the second light sensitive means for orienting said reflecting surface in a direction and to an amount to reduce said signal toward zero whereby a source of light being tracked bears a predetermined relation with said predetermined portion of said reflecting surface.

11. In combination a primary optical system including a spherical mirror having a reflecting surface and an optical correcting means associated therewith, said mirror and said correcting means having a focal point, a scanning wheel supported for rotation about a first axis having a first plurality of secondary optical systems each of which scans along a line on said reflecting surface, means for rotating said wheel about said axis, a first light sensitive element fixedly suported with respect to said rotation of said wheel and effectively positioned at the focal point surface of said primary optical system, said scanning wheel having a second plurality of secondary optical systems, said first and second optical systems each being symmetrically placed about the periphery of said wheel, a second light sensitive element fixedly supported with respect to said rotation of said wheel and effectively positioned at the focal point of said second primary optical system, and means for rotating said wheel about a second axis at right angles to said first axis.

12. In a scanning device, a casing having a spherical mirror at one end of said casing and a light transmitting correcting lens at the other end of said casing for compensating for the spherical aberration inherent in spherical mirrors, said mirror and lens having a common optical axis, a scanning wheel journalled in said casing for rotation about a second axis normal to said optical axis, means for rotating said wheel about said second axis, means for supporting said casing for rotation about said optical axis, means for continuously rotating said casing about said optical axis, means for supporting said casing for universal rotation in azimuth and elevation whereby said optical axis may be oriented in any direction, means for positioning said casing in azimuth and elevation, a first light sensitive means fixedly supported on said casing and located on said second axis at the center of said scanning wheel, second light sensitive means fixedly supported on said casing support and located on said optical axis, a first plurality of lenses symmetrically arranged on said wheel for successively focussing elements of an image on said mirror onto said first light sensitive means, and a plurality of mirrors symmetrically arranged about the periphery of said wheel for successively reflecting a selected element of said image on said mirror onto said second light sensitive means.

13. A system adapted to collect and focus energy waves emanating from all elements of an area containing an object to be detected, said system having an optical axis, a first means sensitive to said energy waves to produce a signal representative of the amplitude of said energy waves falling thereon, a scanning means for scanning said energy waves collected and focussed by said system to project the energy waves emanating from each element of said area successively upon said first sensitive means, a second means separate from said first sensitive means and sensitive to said energy waves and adapted to produce signals representing the error of said optical axis relative to the object, and means for intermittently projecting upon said second sensitive means said energy waves collected and focussed by said system from the element of said area containing said object.

14. In a device for scanning an area and tracking an object within the area, a casing having a spherical mirror at one end of said casing and a light transmitting correcting lens at the other end of said casing for compensating for the spherical aberration inherent in spherical mirrors, said mirror and lens having a common optical axis, a scanning wheel journalled in said casing for rotation about a second axis normal to said optical axis, means for rotating said wheel about said second axis, means for supporting said casing for rotating about said optical axis, means for continuously rotating said casing about said optical axis, a first light sensitive means fixedly supported on said casing and located on said second axis at the center of said scanning wheel, second light sensitive means fixedly supported on said casing support and located on said optical axis, a first plurality of lenses symmetrically arranged on said wheel for successively focussing elements of an image on said mirror onto said first light sensitive means, a plurality of mirrors symmetrically arranged about the periphery of said wheel for successively reflecting a selected element of said image on said mirror onto said second light sensitive means, said second light sensitive means including first and second pairs of sensitive elements for producing first and second signals representative of the error in azimuth and elevation respectively of said optical axis relative to said object, means for supporting said casing for universal rotation in azimuth and elevation whereby said optical axis may be oriented in any direction, and means responsive to said error signals for positioning said casing in azimuth and elevation in a direction to reduce said error signals to zero.

References Cited in the file of this patent

UNITED STATES PATENTS

| | | |
|---|---|---|
| 2,581,589 | Herbst | Jan. 8, 1952 |
| 2,647,258 | McCoy | July 28, 1953 |
| 2,830,288 | Dicke | Apr. 8, 1958 |
| 2,888,674 | Moreno | May 26, 1959 |

FOREIGN PATENTS

| | | |
|---|---|---|
| 352,035 | Great Britain | June 22, 1931 |